(12) United States Patent
Vibert-Charbonnel et al.

(10) Patent No.: US 11,327,189 B2
(45) Date of Patent: May 10, 2022

(54) METHOD AND SYSTEM FOR DETECTING SEISMIC EVENTS

(71) Applicant: SERCEL, Carquefou (FR)

(72) Inventors: Pascal Vibert-Charbonnel, Carquefou (FR); Khac Phuc Hung Thai, Carquefou (FR)

(73) Assignee: SERCEL, Carquefou (FR)

( * ) Notice: Subject to any disclaimer, the term of this patent is extended or adjusted under 35 U.S.C. 154(b) by 391 days.

(21) Appl. No.: 16/320,353

(22) PCT Filed: Jul. 25, 2017

(86) PCT No.: PCT/FR2017/052069
§ 371 (c)(1),
(2) Date: Jan. 24, 2019

(87) PCT Pub. No.: WO2018/020142
PCT Pub. Date: Feb. 1, 2018

(65) Prior Publication Data
US 2019/0250292 A1    Aug. 15, 2019

(30) Foreign Application Priority Data

Jul. 28, 2016  (FR) .................................. 1657250

(51) Int. Cl.
*G01V 1/28* (2006.01)
*G01V 1/24* (2006.01)
(Continued)

(52) U.S. Cl.
CPC .............. *G01V 1/288* (2013.01); *G01V 1/003* (2013.01); *G01V 1/008* (2013.01); *G01V 1/24* (2013.01); *G06F 17/18* (2013.01)

(58) Field of Classification Search
CPC .......... G01V 1/288; G01V 1/24; G01V 1/008; G01V 1/003; G06F 17/18
See application file for complete search history.

(56) References Cited

U.S. PATENT DOCUMENTS

2005/0114034 A1* 5/2005 Bagaini ................... G06F 19/00
                                                                    702/14
2012/0130643 A1* 5/2012 Ozdemir ................. G01V 1/28
                                                                    702/14

OTHER PUBLICATIONS

P Kvadsheim et al: "Herring (sild), killer whales (spekkhogger) and sonar: The 3S-2006 cruise report with preliminary results", (Apr. 30, 2007), https://www.researchgate.net/publication/266334976_Herring_sild_killer_whales_spekkhogger_and_sonar_-_the_3S-2006_cruise_report_with_preliminary_results (Year: 2007).*

(Continued)

*Primary Examiner* — Tarun Sinha
*Assistant Examiner* — Lal C Mang
(74) *Attorney, Agent, or Firm* — IPSILON USA, LLP (57) ABSTRACT

The invention provides a method of detecting a seismic event, which comprises acquiring (110) a digital signal x characteristic of a signal measured by at least one seismic sensor, and calculating (130) a time-frequency distribution for at least one section of a given duration of said signal, in a given frequency band. For each frequency of said frequency band, the calculated time-frequency distribution is normalized. The method also comprises calculating (150) the moving average of the normalized time-frequency distribution ZD, in said frequency band and in a time window, given reference L, centered on the time n; and detecting (160) a seismic event when the average exceeds a predefined threshold value. The invention also provides a corresponding detection system.

22 Claims, 5 Drawing Sheets

(51) Int. Cl.
*G01V 1/00* (2006.01)
*G06F 17/18* (2006.01)

(56) References Cited

OTHER PUBLICATIONS

P Kvadsheim et al: "Herring (sild), killer whales (spekkhogger) and sonar: The 3S-2006 cruise report with preliminary results" Apr. 30, 2007; URL:http://rapporter.ffi.no/rapporter/2007/01189. pdf.
Nancy Salloum: Evaluation de la variabilite spatiale des parametres geotechniques du sol a partir de mesures geophysiques: application a la plaine alluviale de Nahr-Beyrouth (Liban) These pour obtenir Ie grade de docteur de I universite Grenoble Alpes, Apr. 30, 2015; URL:https://tel .archives-ouvertes.fr/tel-01279224.
Enrique Diego Mercerat: 'Sismicite induite et modelisation numerique de I 'endommagement dans un contexte saline' Sep. 14, 2007; URL:http://www.ipgp.fr/-mercerat/cd these mercerat. pdf.
Ekaterina Flin: Discrimination automatisee entre les signaux sismiques d'avalanches et les signaux d'helicopteres Oct. 31, 2008; URL:https://www.researchgate.net/profile/E katerina Bourova-Flin/publication/27489031 9 ekater,naflin rapport octobre 2008/links/552b93410cf29b22c9clc201.pdf?origin=publication list.
International Search Report dated Sep. 28, 2017.
French Search Report dated Mar. 20, 2017.

\* cited by examiner

METHOD AND SYSTEM FOR DETECTING SEISMIC EVENTS

RELATED APPLICATION

This application is a National Phase of PCT/FR2017/052069, filed on Jul. 25, 2017, which claims the benefit of priority from French Patent Application Nos. 16 57250, filed Jun. 28, 2016, the entirety of which are incorporated by reference.

FIELD OF THE INVENTION

In general, the present invention relates to the field of acquiring seismic data.

In particular, the invention relates to the field of onshore or offshore seismic oil exploration, but it may apply to any field using a seismic data acquisition system.

PRIOR ART

In the field of natural resource exploration, and in particular hydrocarbon exploration, the acquisition and processing of seismic data can be used to generate a profile, or image, of the subsurface geophysical structure. Although the profile does not provide a precise location for oil and gas reservoirs, it suggests, to those with experience in the field, the possible presence or absence of such reservoirs.

The seismic data is obtained by sending seismic or acoustic interrogation waves that are generated artificially (vibration, impulsive shock, . . . ) from the surface of the land, at depth, or offshore, by means of a controlled source. Seismic sensors, such as geophones, hydrophones, and/or accelerometers, are used to measure both the propagation and also the reflections and refractions of the artificially-generated seismic waves by the various subsurface layers.

Seismic sensors are associated with seismic acquisition units, or other distance-measuring means, coupled to a central unit, sometimes via intermediate units of the concentrator type, which make it possible to acquire, centralize, and record the signals measured by the seismic sensors.

As mentioned above, such seismic data can be used to map the subsurface in order to detect the possible presence of natural resources, including oil.

Since the quality of mapping depends on the seismic data used to perform the mapping, it is important to be able to use the acquired seismic data in reliable manner, and in particular to be able to ensure correct functioning of the seismic sensors.

The document entitled: "Herring (sild), killer whales (spekkhogger) and sonar: The 35-2006 cruise report with preliminary results" by Petter Kvadsheim et al. describes a prior art method in which background noise is subtracted from the acquired acoustic data in order to detect vocalizations of marine mammals.

SUMMARY OF THE INVENTION

To this end, the invention provides a method of detecting a seismic event, characterized in that said method comprises the following steps:
  acquiring a digital signal, given reference x, as a function of time, given reference n, said acquired digital signal being characteristic of a signal measured by at least one seismic sensor;
  calculating a time-frequency distribution, given reference $X_D$, for at least one section, given reference $x_D$, of a given duration, given reference D, of said signal, in a given frequency band, preferably in the 10 Hertz (Hz) to 50 Hz frequency band;
  for each frequency of said frequency band, given reference $Z_D$, normalizing the calculated time-frequency distribution;
  calculating the moving average, given reference $y_L$, of the normalized time-frequency distribution $Z_D$, in said frequency band and in a time window, given reference L, centered on the time $\underline{n}$; and
  detecting a seismic event when the average $y_L$ exceeds a predefined threshold value, given reference VS.

Such a detection method that combines application of a normalized time-frequency distribution to the acquired signal with calculation of a moving average of this normalized time-frequency distribution, in a time window, makes it possible to detect in reliable manner a seismic event resulting from activation of a seismic source.

Normalization of the time-frequency distribution makes it possible to obtain a magnitude that is independent of the amplitude and of the energy of the acquired signal, in such a manner that the predefined threshold value for detecting a seismic event does not need to be adapted as a function of the characteristics of the various acquired signals. In other words, a single threshold value may be used to detect in reliable manner the presence or the absence of a seismic event, regardless of the characteristics of the received signals, in particular the amplitude and energy characteristics.

It is thus possible to verify in reliable manner whether or not the sensor is receiving a signal that corresponds to a seismic event, regardless of any reason for non-reception. A lack of reception may be due to a failure in the coupling of the sensor to the ground, or it may be due to an element of the seismic sensor becoming disconnected.

Such a method further enables a seismic event resulting from activation of a seismic source to be detected, without knowing the instant of activation of the source, also referred to as "time of firing". Conversely, using the method of the invention to detect a seismic event, at a given time, makes it possible to identify the time of firing.

The method may also make it possible to detect a failure of a seismic sensor by comparing the detection results associated with the sensor with the results obtained from other sensors or by verifying whether, following activation of the source at a given time, an event has or has not been detected by said seismic sensor. Such a method may thus be applied to detecting a failed sensor in the context of long-term seismic monitoring, particularly as an oil well tool, e.g. for six months. The method may also be applied to the microseismic field in order to trigger recording of seismic data only when a seismic event is detected, so as to save memory.

In a particular implementation, provision may be made for a seismic event to be detected each time, over the duration D, that the average $y_L$ exceeds and then drops below the predefined threshold value VS.

According to a particular aspect of the invention, the normalization step is defined in such a way that the resulting normalized time-frequency distribution is a magnitude that is independent of the amplitude and the energy of the acquired signal.

According to a particular aspect of the invention, since said method is applied to various measured signals, the detection step is performed with said predefined threshold value, regardless of the amplitude or the energy of each of said signals.

According to an advantageous characteristic of the invention, the normalization $Z_D(n,f)$ of the time-frequency distribution is calculated by subtracting from the time-frequency distribution its average $\mu_x(f)$ and by dividing the result of the subtraction by the standard deviation $\sigma_x(f)$ of said time-frequency distribution:

$$Z_D(n,f) = \frac{X_D(n,f) - \mu_X(f)}{\sigma_X(f)}$$

According to an advantageous characteristic of the invention, in order to detect a vibration type seismic event, the time-frequency distribution $X_D(n,f)$ comprises an apodization function of duration lying in the range 32 milliseconds (ms) to 128 ms, for example equal to 64 ms.

According to an advantageous characteristic of the invention, in order to detect an impulse type seismic event, the time-frequency distribution $X_D(n,f)$ of the signal $x_D(n)$ comprises an apodization function of duration lying in the range 256 ms to 2048 ms, for example equal to 1024 ms.

According to an advantageous characteristic of the invention, calculating the time-frequency distribution $X_D(n,f)$ of the signal section $x_D(n)$ comprises applying a short-term Fourier transform to said signal section.

According to an advantageous characteristic of the invention, the time-frequency distribution $X_D(n,f)$ is calculated by the formula given below:

$$X_D(n,f) = A \left| \sum_{k=-N+1}^{k=N} h(k) \cdot x(n-k) \cdot e^{2|\pi fk} \right|^2$$

where:
N is a natural number
h is an apodization function of duration 2N−1; and
A is a coefficient equal to:

$$\frac{1}{A} = \sum_{k=-N+1}^{k=N} h(k)$$

The invention also provides a method of determining the state of coupling with the ground of at least one seismic sensor, said method comprising the following steps:
executing an above-described method of detecting a seismic event, said acquired digital signal $\underline{x}$ being characteristic of a signal measured by said at least one seismic sensor; and
detecting the state of the coupling of said at least one seismic sensor with the ground when said seismic event has been detected.

Said at least one seismic sensor includes a device for measuring a ground motion signal. The seismic sensor also includes a transmission module for transmitting the measured, and possibly digital, signal, directly or indirectly, to an acquisition device, such as a seismic acquisition unit, to a collection unit, referred to as a concentrator, or to a central unit. The steps of said method may then be implemented by said acquisition device.

The invention also provides a computer program including program code instructions for executing steps of a method as described above, when said program is executed by a computer or by a processor.

Said processor may be included in the housing of a seismic sensor, of a seismic acquisition unit, of a collection unit, referred to as a concentrator, or of a central unit.

In particular, provision may be made for a non-transient computer-readable recording medium to be used to store a set of instructions that can be executed by a processor in order to implement all or part of the above-described method.

The invention also provides a system for detecting a seismic event, which system is configured to execute an above-described method of detecting a seismic event.

According to an advantageous characteristic of the invention, said system comprises a seismic acquisition unit that is connectable to at least one seismic sensor. Said seismic acquisition unit comprises:
an acquisition module configured to execute said digital signal acquisition step, said acquired digital signal $\underline{x}$ being characteristic of a signal measured by said at least one seismic sensor; and
a processor module for processing data and configured to execute said steps of: calculating time-frequency distribution; normalizing; calculating moving average; and detecting a seismic event.

Said seismic sensor may optionally be integrated in the housing of the seismic acquisition unit.

According to an advantageous characteristic of the invention, said seismic acquisition unit comprises a transmission module, preferably a radio transmission module, making it possible to transmit the processed data to an external unit such as a mobile data recovery unit.

The invention also provides a system for determining the state of coupling with the ground of at least one seismic sensor, said system being configured to execute an above-described method of determining the state of coupling.

BRIEF DESCRIPTION OF THE DRAWINGS

Other characteristics and advantages of the invention can be seen better on reading the following description, which is purely illustrative and non-limiting and should be read with reference to the accompanying drawings, in which.

DETAILED DESCRIPTION

The concept of the invention is described more completely below with reference to the accompanying drawings, which show implementations of the concept of the invention. However, this concept of the invention may be implemented in numerous different forms and should not be interpreted as being limited to the implementations described herein. Instead of that, these implementations are proposed so that the description is complete, and communicates the extent of the concept of the invention to the person skilled in the art. Consequently, the extent of the invention is defined by the accompanying claims.

A reference in any part of the description to "an embodiment or an implementation" indicates that a particular function, structure, or characteristic described with reference to that embodiment or implementation is included in at least one embodiment or implementation of the present invention. Thus, the appearance of the expression "in an embodiment (or in an implementation)" in various places throughout the description does not necessarily refer to the same embodiment (or implementation). Furthermore, the particular functions, structures, or characteristics may be combined in any appropriate manner in one or more embodiments or implementations.

In the examples described below, the seismic events to be detected result from activating a source of vibrations (e.g. a vibration truck) or impulses (e.g. an explosive or an air canon used underwater) that generates wave trains measured by one or more remote seismic sensors. The seismic acquisition method and corresponding system can be used onshore and/or offshore. In a preferred implementation, the or each seismic sensor for which the method is implemented, is driven into the ground. As explained below, a possible application of the method lies in detecting the state of coupling of at least one seismic sensor with the ground.

The signal measured by the or each seismic sensor generally comprises a seismic signal resulting both from activating said vibratory or impulse source and from noise. Noise is usually considered as comprising natural or industrial noise, and noise caused by activating the source, such as for example air waves.

Figure 15:
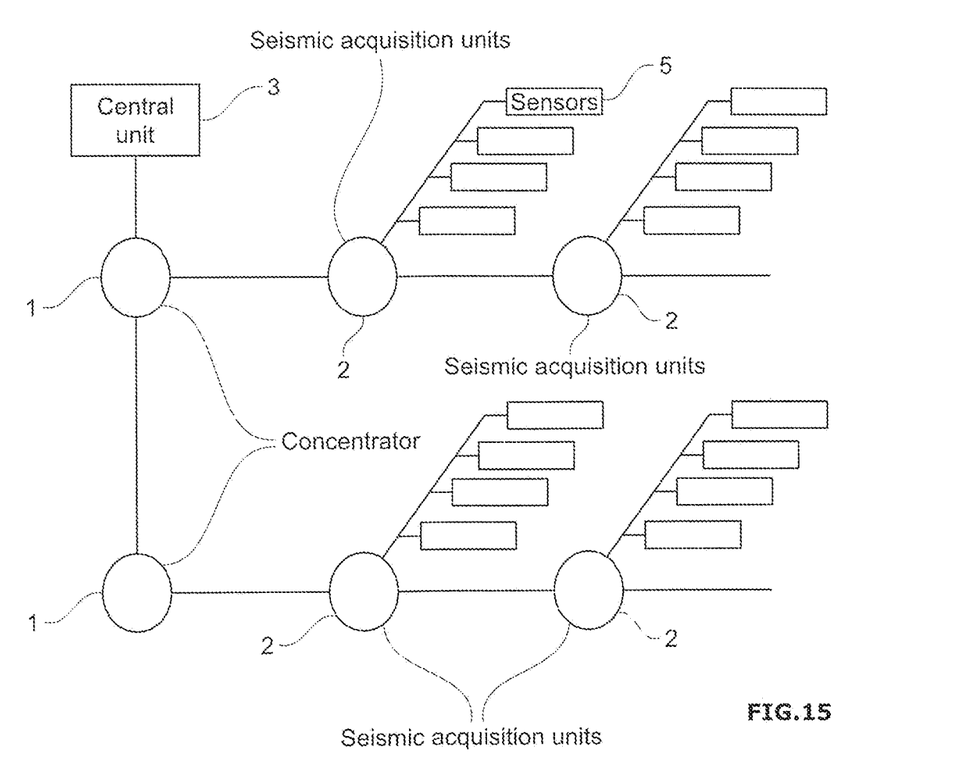
FIG. 15 is a diagrammatic view of a seismic acquisition system suitable for implementing a method of detecting a seismic event, in accordance with an embodiment of the invention.

FIG. 15 shows a system for acquiring seismic data that comprises a network of seismic acquisition units 2, to which seismic sensors 5 are connected. The network may be of wired type or of wireless, in particular radio, type.

The seismic sensors 5 may be interconnected in groups of sensors so as to constitute clusters, known as "strings". Each seismic acquisition unit 2 may be associated with one or more cluster(s) of seismic sensors 5.

The seismic sensors may be of the analog or digital type. The seismic sensors may comprise a geophone, an accelerometer, a hydrophone (offshore), or a combination thereof.

A seismic sensor of the analog type includes a device for measuring an analog signal corresponding to the seismic and/or acoustic waves received. A seismic acquisition unit thus ensures analog-to-digital conversion of analog data from the sensors.

In addition, a seismic sensor may be of the digital type, serving to provide a digital signal representative of the analog parameter constituted by the received seismic and/or acoustic waves. A digital sensor may be made in the form of a micro-machined sensor known as a micro-electromechanical system (MEMS).

Figure 16:
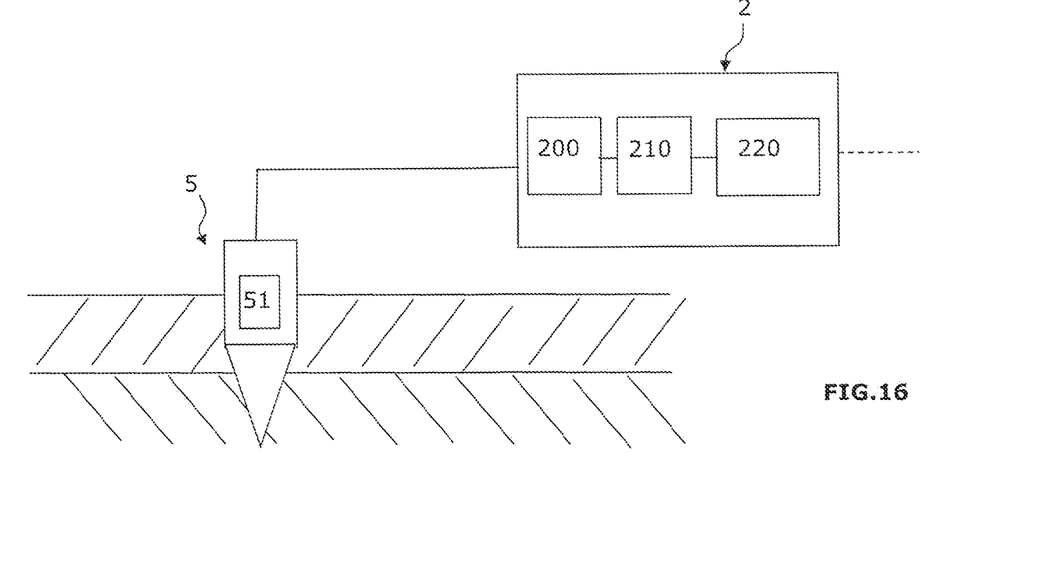
FIG. 16 is a diagrammatic view of a seismic sensor driven into the ground and connected to a seismic acquisition unit, in accordance with an embodiment of the invention.

The seismic acquisition units 2 process, at least in part, signals emitted by the sensors 5. As shown in FIG. 16, each seismic acquisition unit 2 is in the form of an electronics housing that includes an acquisition module 200 making it possible to acquire the signal provided by one or more sensors, and a (digital) signal processing module 210 for providing "seismic" data. The acquisition unit may also comprise a memory for storing seismic data and/or a power supply module of the battery type.

Each seismic acquisition unit 2 includes a data communications module 220, optionally of the wired type, making it possible to communicate with another element of a seismic acquisition system, such as a concentrator 1.

Where appropriate, each seismic acquisition unit 2 includes an analog-to-digital converter for digitizing signals as measured and transmitted by the sensor(s) when the sensor(s) is/are analog sensor(s). It should be observed that, in certain embodiments, the seismic sensor 5 may be integrated in the same housing as the various components of the seismic acquisition unit.

Advantageously, the seismic data acquisition system also comprises intermediate modules 1, referred to as concentrators, serving in particular to provide signal processing functions and interface functions with the network of seismic acquisition units 2, such as transferring data from the seismic acquisition units 2 to a central unit 3; and sending commands received from the central unit 3 to the seismic acquisition units 2. For onshore activity, said central unit 3 is usually loaded on a truck, while for offshore activity said central unit is usually loaded on a boat.

Communication between the concentrators and the central unit may be of wired or wireless type.

The (digital) data corresponding to the signals measured by the sensors may also be processed by the concentrators 1, which thus receive the data from one or more seismic acquisition units 2 in order to process it before sending it to the central unit 3.

To this end, the concentrators are connected to the seismic acquisition units 2 and are configured to be able to communicate with the central unit 3. The central unit 3 makes it possible to operate the seismic acquisition units 2 and centralizes the data transmitted by the network resulting from the signals measured by the seismic sensors 5.

Each seismic acquisition unit 2 (and/or concentrator 1) may also record this data locally. The data may then be delivered at specific moments by wired or wireless connection, or equally well via a movable base that is moved by an operator up to each seismic acquisition unit 2 and/or concentrator 1.

Figure 1:
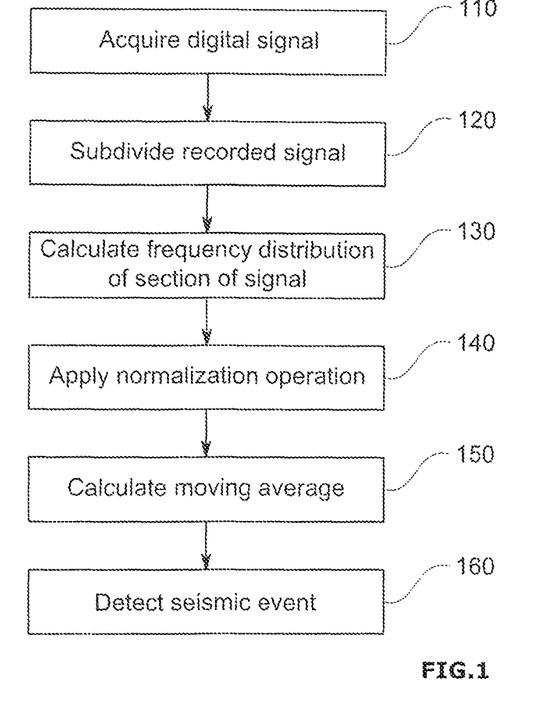
FIG. 1 is a flowchart showing several steps of a method of detecting a seismic event in an implementation of the invention.

FIG. 1 is a flowchart showing steps of a method of detecting a seismic event in accordance with an implementation. The method may be implemented by means of a seismic acquisition system as described above.

In the implementation described below, the steps of the method for verifying the presence of a seismic event are performed in a seismic acquisition unit. In a variant, all or some of the steps of the method may be performed in a concentrator or in the central unit or also in a seismic sensor.

In step 110, a digital signal x is acquired as a function of discrete time n. In an implementation, this step is performed by an acquisition module of a seismic acquisition unit 2, which acquires the digital signal x(n) by digitally converting the analog signal as measured, as a function of continuous time, by a seismic sensor or by a cluster of analog seismic sensors. As observed above, when the sensor(s) are digital sensors, the signal transmitted by the sensor(s) is a digital signal that the seismic acquisition unit can acquire directly without needing to convert it.

The signal measured by the sensor(s) is measured continuously over a duration W, e.g. of the order of 10 minutes.

In a preferred implementation, in step 120, the recorded signal x(n) is subdivided into a plurality of successive sections of duration D, given reference $x_D(n)$.

The durations D are preferably equal from one section to another, but provision could be made for the duration of one section to be different from the duration of another section.

The sections of duration D may overlap. The duration D is equal to not less than the duration of emission by the seismic source, also referred to as "spread". Advantageously, in order to detect a vibration type seismic event, the duration D lies in the range 50 seconds (s) to 750 s, preferably in the range 100 s to 500 s, and advantageously in the range 150 s to 300 s. In the example shown in the figures, the duration D is 200 seconds. Advantageously, in order to detect an impulse type seismic event, the duration D lies in the range 10 seconds (s) to 250 s, preferably in the range 20 s to 100 s, and advantageously in the range 30 s to 60 s.

In step 130, a time-frequency distribution of a section $x_D(n)$ of said signal is calculated, and given reference $X_D(n,f)$. Said calculation is performed on a given frequency band, given reference B. The useful frequency band is the one that contains the seismic data that is useful for detecting a seismic event.

Advantageously, said frequency band B is the 10 Hz to 50 Hz band.

In an implementation, calculating the time-frequency distribution $X_D(n,f)$ of the signal section $x_D(n)$ comprises applying a short-term Fourier transform to said signal section. Application of the short-term Fourier transform is also referred to as the spectrogram method. In a variant, it is also possible to use other time-frequency distributions, such as the Wigner-Ville distribution, smoothed Wigner-Ville distribution, the autoregressive moving average method, Capon's method, Lagunas' method.

In the examples shown in the figures, the time-frequency distribution $X_D(n,f)$ is calculated by the formula given below:

$$X_D(n, f) = A \left| \sum_{k=-N+1}^{k=N} h(k) \cdot x(n-k) \cdot e^{-2j\pi fk} \right|^2$$

where:
N is a natural number
h is an apodization function of duration 2N−1; and
A is a coefficient equal to:

$$\frac{1}{A} = \sum_{k=-N+1}^{k=N} h(k)$$

The duration of the apodization function corresponds to the length of the time-frequency distribution analysis window.

In order to detect a vibration type seismic event, the apodization function is of duration lying in the range 32 ms to 128 ms, for example equal to 64 ms.

It should be observed that selecting such a duration goes against the usual practice of the person skilled in the art who would tend to select a longer duration in order to obtain good frequency resolution.

In order to detect an impulse type seismic event, the apodization function is of duration lying in the range 256 ms to 2048 ms, for example equal to 1024 ms. It should be observed that selecting such a duration goes against the usual practice of the person skilled in the art who would tend to select a shorter duration since by definition, the impulse is of short duration.

Selecting such durations as a function of apodization favors detecting a seismic event.

In step 140, a normalization operation is applied to the calculated time-frequency distribution. This normalization operation is applied for each frequency of said frequency band. Thus, for each instant n of duration D, and for each frequency of the band B, a value of the thus normalized time-frequency distribution is obtained, and given reference $Z_D(n,f)$.

In an implementation, the normalization $Z_D(n,f)$ of the time-frequency distribution is calculated by subtracting from the time-frequency distribution its average $\mu_x(f)$ and by dividing the result of the subtraction by the standard deviation $\sigma_x(f)$ of said time-frequency distribution:

$$Z_D(n, f) = \frac{X_D(n, f) - \mu_X(f)}{\sigma_X(f)}$$

Thus, the normalized time-frequency distribution has an average of zero and a standard deviation of 1.

The normalization operation is not limited to the implementation in which the time-frequency distribution is calculated by subtracting its average and by dividing the result by the standard deviation of said time-frequency distribution. The "normalization" operation corresponds to an operation making it possible to obtain a magnitude that is independent of the amplitude and of the energy of the measured or acquired signal.

Step 150 comprises calculating the moving average, given reference $y_L$, of the normalized time-frequency distribution $Z_D$, in said frequency band and in a time window, given reference L, centered on the time $\underline{n}$.

The term "moving" refers to the fact that said average is calculated for each of the times n of the duration D, by moving the time window L to center it on said time $\underline{n}$.

By way of example, the value of L is equal to two seconds for detecting a vibration type event, and the value of L is for example equal to one second for detecting an impulse type event. Provision may be made for L to lie in the range 0.5 s to 5 s.

In an implementation, said average $y_L(n)$ is written as:

$$y_L(n) = \sum_{k=n-\frac{L}{2}}^{k=n+\frac{L}{2}-1} \sum_{f=F_L}^{f=F_H} Z_D(k, f)$$

with $B=[F_L;F_H]$ in Hertz.

$F_L$ and $F_H$ being the lower and upper bounds of the frequency band B.

It is thus possible to proceed to step 160, on detecting a seismic event by defining that a seismic event is detected when the average $y_L(n)$ is greater than a predefined threshold value VS.

The detection threshold value is selected in such a manner as to have the best compromise between good detection and a small number of false positives. The study of a curve of the probability of good detection as a function of the probability of false detection can be used to set the detection threshold. Advantageously, the threshold value is selected from the range 0.7 and 0.9. In the example shown in the figures, the threshold value is equal to 0.8.

An example of detecting a seismic event is described below with reference to FIGS. 2 to 10.

For reference purposes and in order to validate the method, a source is activated so as to generate a signal S corresponding to three seismic events 21, 22, 23. In the example shown in FIGS. 2 to 10, said source is a vibratory type source. In a variant, said source may be an impulse source.

FIGS. 3 to 6 show detection of a seismic event from a signal measured by a seismic sensor close to the source and resulting from activation of the source.

Figure 3:
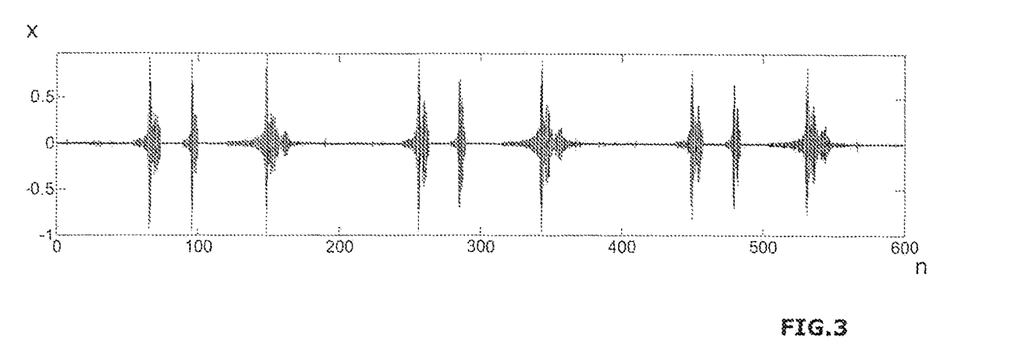
FIG. 3 is a graph showing a normalized digital signal $\underline{x}$ acquired over a duration of six hundred seconds from a signal measured by a seismic sensor close to the source of FIG. 2, in accordance with an implementation of the invention.

FIG. 3 shows acquisition of a digital signal $\underline{x}$ as a function of the discrete time $\underline{n}$, over 600 seconds. The acquired signal x(n) results from the digitization of a signal measured by the seismic sensor close to the source, following activation of the source.

Figure 4:
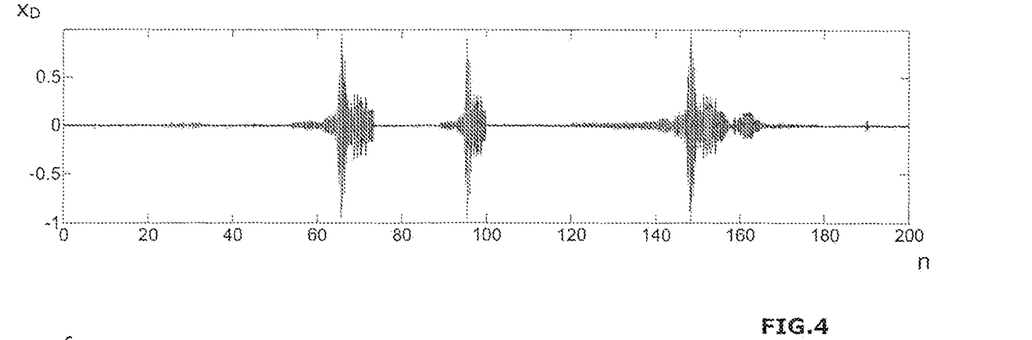
FIG. 4 is a graph showing the signal $x_D$ resulting from subdividing the signal $\underline{x}$ of FIG. 3 into two hundred second sections, in accordance with an implementation of the invention.

As shown in FIG. 4, the signal x(n) is subdivided into sections in order to obtain a signal $x_D(n)$ of 200 seconds duration. In the rest of the description, the operations are described for one section, but these operations may naturally be repeated for the other sections.

Figure 5:
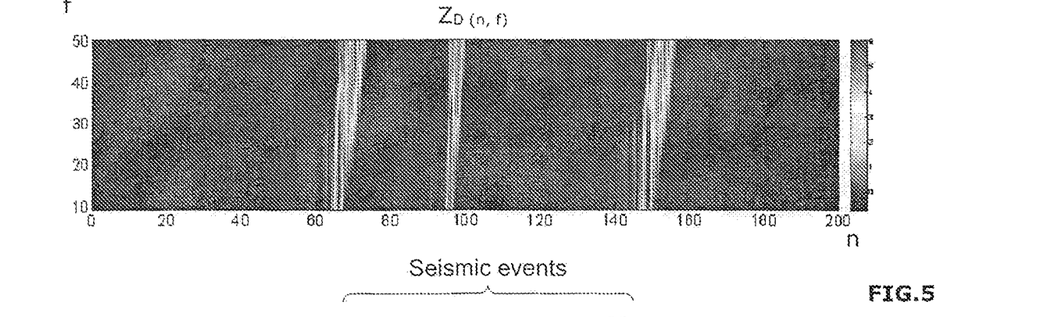
FIG. 5 is a graph giving the values of a time-frequency distribution that is applied to the signal $x_D$ of FIG. 4 in the 10 Hz to 50 Hz frequency band and that is normalized, in accordance with an implementation of the invention.

The time-frequency distribution that is normalized and applied to the signal $x_D(n)$ in the 10 Hz to 50 Hz frequency band is shown in FIG. 5. As can be seen in FIG. 5, for each time $\underline{n}$ and for each frequency f, there is obtained an energy value that in the FIG. 5 example is graduated over a scale of values from 0 to 6.

Figure 6:
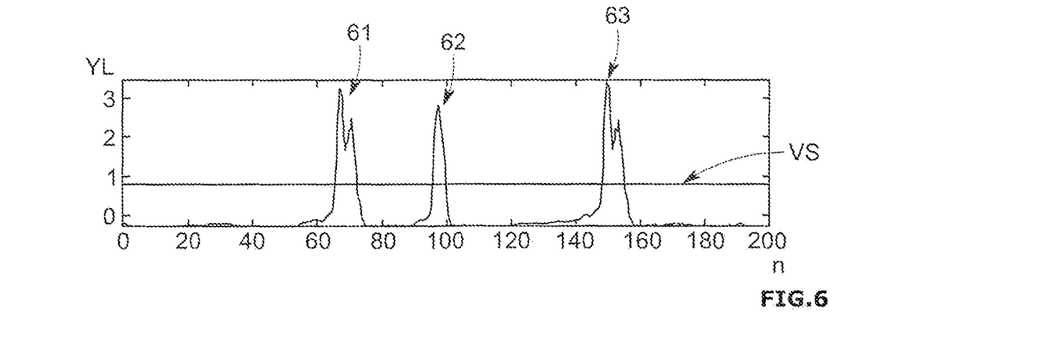
FIG. 6 is a graph showing the moving average $y_L$ of said normalized time-frequency distribution of FIG. 5, in accordance with an implementation of the invention.

Calculating the moving average of said time-frequency distribution $Z_D(n,f)$ makes it possible to obtain the curve $y_L(n)$. As shown in FIG. 6, this curve corresponds to the average for each instant n on the 10 Hz to 50 Hz band of said previously-calculated energy values.

The curve $y_L(n)$ exceeds the predefined threshold value VS on three occasions, making it possible to detect three seismic events 61, 62, 63, that correspond in effect to the seismic events 21, 22, 23 resulting from activation of the source.

FIGS. 7 to 10 show detection of a seismic event from a signal measured by another sensor that is further away from the source, said measured signal resulting from activation of the source.

Figure 2:
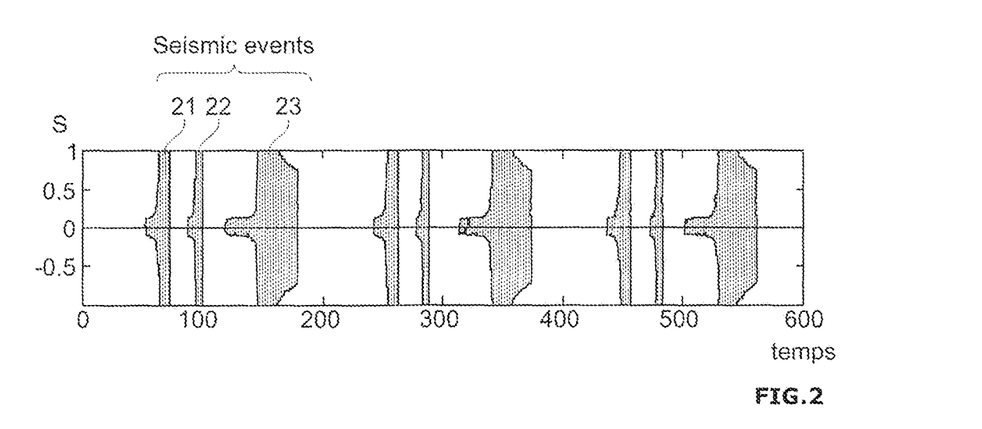
FIG. 2 is a graph showing as a function of time the signal S emitted by a vibratory seismic source for a duration of 600 seconds, in accordance with an implementation of the invention.
Figure 7:
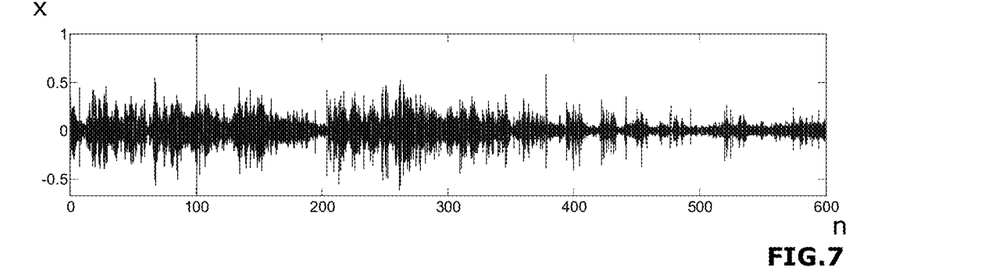
FIG. 7 is a graph showing another digital signal x' acquired over a duration of six hundred seconds from a signal measured by a seismic sensor further away from the source of FIG. 2, in accordance with an implementation of the invention.

FIG. 7 shows the acquisition over 600 seconds of a digital signal $\underline{x}$ as a function of the discrete time $\underline{n}$. The acquired signal x(n) results from digitizing a signal measured by the seismic sensor at a distance from the source following activation of the source, which emitted a signal S as shown in FIG. 2 as explained above. It should be observed that in the raw graph of FIG. 7, the presence of a seismic event is not immediately apparent.

Figure 8:
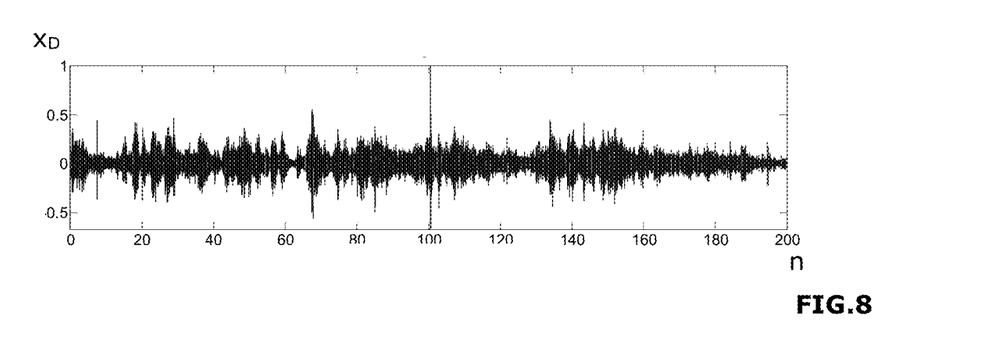
FIG. 8 is a graph showing the signal $x_D$ resulting from subdividing the signal $\underline{x}$ of FIG. 7 into two hundred second sections, in accordance with an implementation of the invention.
Figure 9:
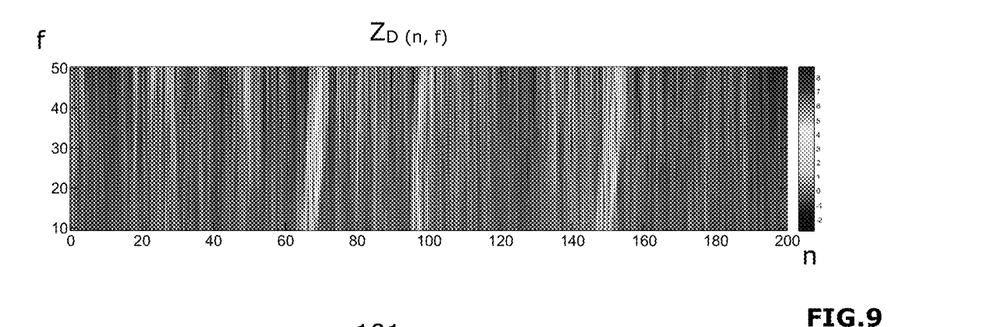
FIG. 9 is a graph giving the values of a time-frequency distribution that is applied to the signal $x_D$ of FIG. 8 in the 10 Hz to 50 Hz frequency band and that is normalized, in accordance with an implementation of the invention.

As shown in FIG. 8, the signal x(n) is subdivided into a section in order to obtain a signal $x_D(n)$ of 200 seconds. The time-frequency distribution that is normalized and applied to the signal $x_D(n)$ in the 10 Hz to 50 Hz frequency band is shown in FIG. 9. As can be seen in FIG. 9, for each time $\underline{n}$ and for each frequency f, there is obtained an energy value that in the FIG. 9 example is graduated over a scale of values from −2 to 8.

Figure 10:
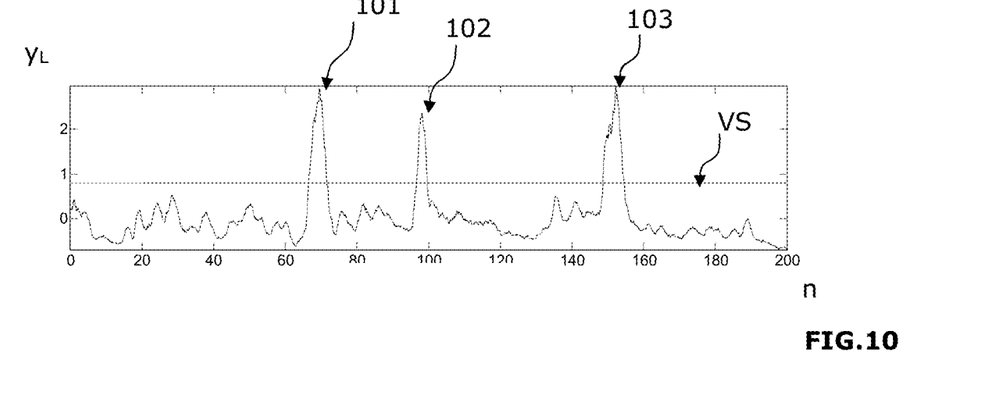
FIG. 10 is a graph showing the moving average $y_L$ of said normalized time-frequency distribution of FIG. 9, in accordance with an implementation of the invention.

Calculating the moving average of said time-frequency distribution $Z_D(n,f)$ makes it possible to obtain the curve $y_L(n)$. As shown in FIG. 10, this curve $y_L(n)$ exceeds the predefined threshold value VS on three occasions, making it possible to detect three seismic events 101, 102, 103, measured by the seismic sensor. This corresponds specifically to the seismic events 21, 22, 23 that result from activating the source.

The method can also be used to conclude the absence of any seismic event when the average $y_L(n)$ remains below the predefined threshold value VS (FIGS. 11 to 14).

Figure 11:
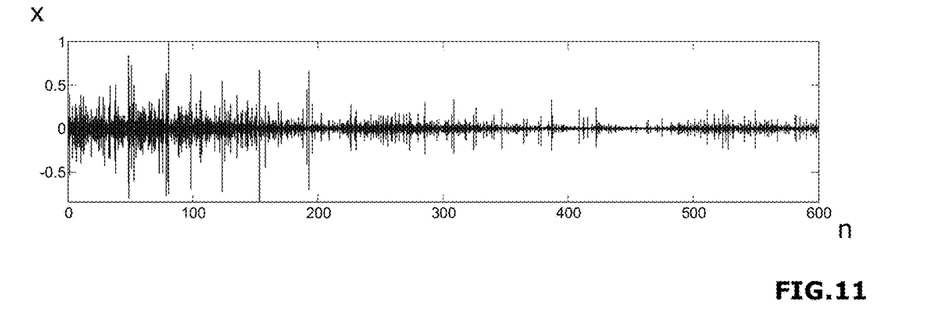
FIG. 11 is a graph showing another digital signal $\underline{x}$ acquired over a duration of six hundred seconds from a signal measured by a seismic sensor in the absence of a source, in accordance with an implementation of the invention.

FIG. 11 shows the acquisition over 600 seconds of a digital signal x(n) resulting from digitizing a signal measured by a seismic sensor. Although it is similar a priori to the signal shown in FIG. 7, the signal x(n) and the signal measured by the seismic sensor correspond to noise as is made clear by means of the detection applied method as described below with reference to FIGS. 12 to 14.

Figure 12:
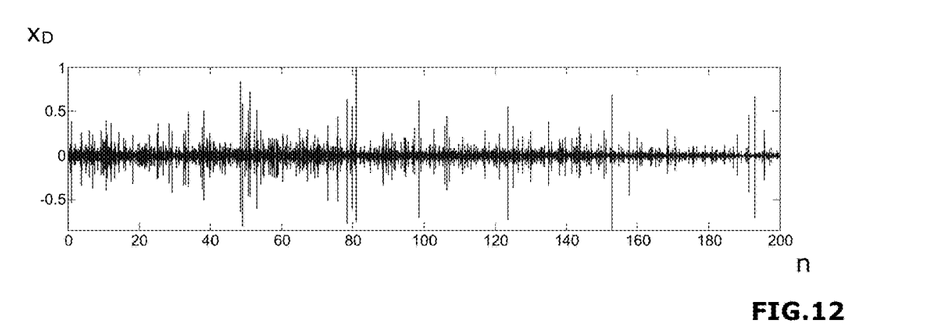
FIG. 12 is a graph showing the signal $x_D$ resulting from subdividing the signal $\underline{x}$ of FIG. 11 into two hundred second sections, in accordance with an implementation of the invention.
Figure 13:
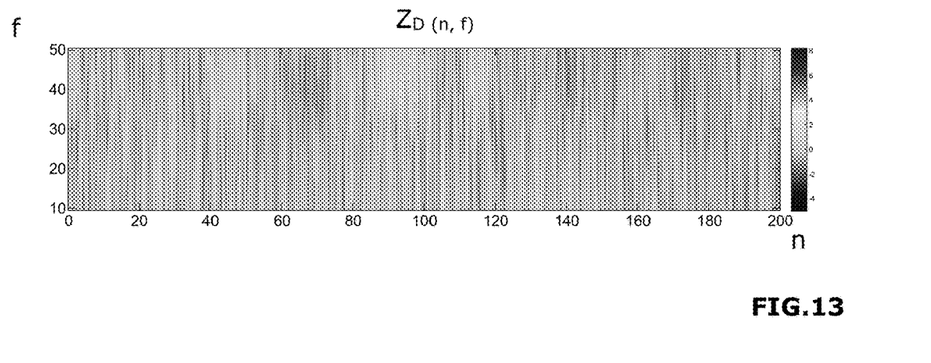
FIG. 13 is a graph giving the values of a time-frequency distribution that is applied to the signal $x_D$ of FIG. 12 in the 10 Hz to 50 Hz frequency band and that is normalized, in accordance with an implementation of the invention.

As shown in FIG. 12, the signal x(n) is subdivided into a section in order to obtain a signal $x_D(n)$ of 200 seconds. The time-frequency distribution that is normalized and applied to the signal $x_D(n)$ in the 10 Hz to 50 Hz frequency band is shown in FIG. 13. As can be seen in FIG. 13, for each time $\underline{n}$ and for each frequency f, there is obtained an energy value that in the FIG. 13 example is graduated over a scale of values from −4 to 8.

Figure 14:
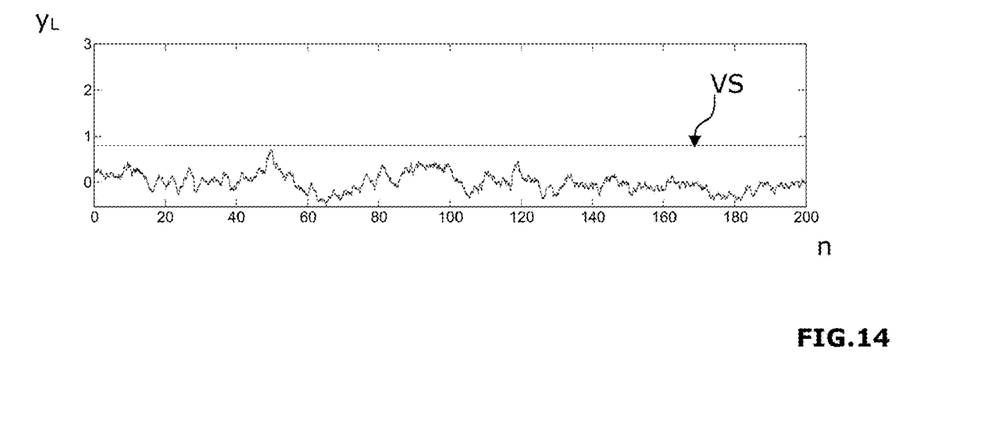
FIG. 14 is a graph showing the moving average $y_L$ of said normalized time-frequency distribution of FIG. 13, in accordance with an implementation of the invention.

Calculating the moving average of said time-frequency distribution $Z_D(n,f)$ makes it possible to obtain the curve $y_L(n)$ that remains beneath the predefined threshold value VS, which makes it possible to declare the absence of any seismic event.

It should be observed that the values of the signals shown in the graphs of FIGS. 2 to 4, 7, 8, 11, and 12 have been brought into the range of values [−1,1] in an attempt to simplify their representation. However, it is not necessary to modify the signal values in this way in order to implement the method of the invention.

The presence of a seismic event in the acquired data may be verified for each sensor or for each group (or cluster) of sensors, depending on the configuration of the seismic acquisition system.

The above-described method of detecting a seismic event finds a particularly advantageous application in determining the state of coupling between a seismic sensor or a group of seismic sensors and the ground.

In the example shown in FIG. 16, said seismic sensor for which it is desired to determine the state of coupling includes a measuring device 51 for measuring a ground motion signal. Said sensor is also configured to transmit said signal, possibly digital, to the acquisition module 200 of a seismic acquisition unit 2. If the signal transmitted by the sensor is analog, the acquisition unit is configured to digitize it. The processor module 210 is configured to execute an above-described method of detecting a seismic event.

Said processor module is also configured to determine that said seismic sensor 5 or group of seismic sensors is correctly coupled to the ground when the or each seismic event has been detected. In addition, the processing module is also configured to determine that said seismic sensor 5 or group of seismic sensors is not properly coupled to the ground when no seismic event has been detected but while a seismic source has been activated.

Naturally and as mentioned above, some or all of these steps can be executed by another unit, such as a concentrator or a central unit. Provision may also be made for the seismic sensors to include in their housing electronic and/or computer components that are configured to execute all or some of said steps of the method of detecting a seismic event or the state of coupling.

The method of detecting a seismic event and/or of determining the state of coupling may in particular be implemented in one or more of the seismic sensors. In particular, said or each seismic sensor may include elements of the electronic and/or computer type configured to execute the various steps of the method.

In a preferred implementation, the method of detecting a seismic event method is executed within a seismic sensor, a seismic acquisition unit, and/or a concentrator when an interruption in the transmission of seismic data to the central unit is detected, e.g. due to a cable break or loss of the radio transmission signal.

Advantageously, the detected events associated with various seismic sensors may be compared with one another in order to identify sensor malfunctions. To this end, the information corresponding to the detected events associated with various seismic sensors of the seismic acquisition system can be transmitted to the central unit in order to be compared.

The above-described functions and steps may be implemented in the form of a computer program or via hardware components (e.g. programmable gate arrays). In particular, the functions and the steps performed by the sensors, the units, or the concentrators may be performed by sets of computer instructions or modules implemented by a processor or a controller or they may be performed by dedicated electronic components of the field-programmable gate array (FPGA) or application-specific integrated circuit (ASIC) type. It is also possible to combine computer parts and electronic parts.

The computer programs, or computer instructions, may be contained in program storage devices, e.g. computer-readable digital data storage media, or executable programs. The programs or instructions may also be executed from program storage peripherals.

The invention is not limited to the embodiments or implementations shown in the drawings. Consequently, it should be understood that, when the characteristics mentioned in the accompanying claims are followed by references, those references are included solely with the aim of improving understanding of the claims and in no way limit the ambit of the claims.

In addition, the term "comprising" does not exclude other elements or steps. Furthermore, characteristics or steps that are described with reference to any one of the above-described embodiments or implementations may also be used in combination with other characteristics or steps of other above-described embodiments or implementations.

The invention claimed is:

1. A method of detecting a seismic event, wherein said method comprises the following steps:

measuring a signal by at least one seismic sensor that is configured to transmit said signal to a seismic acquisition unit; wherein said seismic acquisition unit is configured to acquire a digital signal x(n), as a function of time n, said acquired digital signal being characteristic of said signal measured by and transmitted from said at least one seismic sensor;

said seismic acquisition unit comprising a processor that is configured to further:

calculate a time-frequency distribution $X_D(n,f)$, for at least one section $x_D(n)$, of a given duration, D of said signal, in a given frequency band;

for each frequency of said frequency band, normalize the calculated time-frequency distribution $X_D(n,f)$ so as to obtain a normalized time-frequency distribution $Z_D(n,f)$;

calculate the moving average, $y_L$ of the normalized time-frequency distribution $Z_D(n,f)$, in said frequency band and in a time window L, centered on the time n; and detect a seismic event when the moving average $y_L$, exceeds a predefined threshold value VS, wherein the normalization of the time-frequency distribution is calculated by subtracting from the time-frequency distribution $X_D(n,f)$, its average and by dividing the result of the subtraction by the standard deviation of said time-frequency distribution, so that the normalized time-frequency distribution $Z_D(n,f)$ corresponds to a formula given below:

$$Z_D(n, f) = \frac{X_D(n, f) - \mu_X(f)}{\sigma_X(f)}.$$

and wherein the normalized time-frequency distribution obtains a magnitude that is independent of the amplitude and of the energy of the acquired signal, and wherein said acquired signal is used to generate either one of a profile, or an image, of a sub surface geophysical structure.

2. The method according to claim 1, wherein, the acquired signal having an amplitude and an energy, the normalization step is defined in such a manner that the resulting normalized time-frequency distribution $Z_D(n,f)$ is a magnitude that is independent of said amplitude and independent of said energy of the acquired signal.

3. The method according to claim 1, wherein, since said method is applied to various measured signals, the detection step is performed with said predefined threshold value, regardless of the amplitude or the energy of each of said signals.

4. The method according to claim 1, wherein the acquisition of the digital signal comprises digitizing said measured signal by said at least one seismic sensor.

5. The method according to claim 1, wherein, in order to detect a vibration type seismic event, the time-frequency distribution $X_D(n,f)$ comprises an apodization function of duration lying in the range 32 ms to 128 ms.

6. The method according to claim 1, wherein, in order to detect an impulse type seismic event, the time-frequency distribution $X_D(n,f)$ of the signal $x_D(n)$ comprises an apodization function of duration lying in the range 256 ms to 2048 ms.

7. The method according to claim 1, wherein, calculating the time-frequency distribution $X_D(n,f)$ of the signal section $x_D(n)$ comprises applying a short-term Fourier transform to said signal section.

8. The method according to claim 1, wherein the time-frequency distribution $X_D(n,f)$ is calculated by the formula given below:

$$X_D(n, f) = A \left| \sum_{k=-N+1}^{k=N} h(k) \cdot x(n-k) \cdot e^{-2|\pi f k|} \right|^2$$

where:
N is a natural number
h is an apodization function of duration 2N−1; and
A is a coefficient equal to:

$$\frac{1}{A} = \sum_{k=-N+1}^{k=N} h(k).$$

9. The method of determining a state of coupling with a ground of at least one seismic sensor, said method comprising the following steps:
executing a method of detecting a seismic event, in accordance with claim 1, said acquired digital signal x(n) being characteristic of a signal measured by said at least one seismic sensor; and
detecting the state of the coupling of said at least one seismic sensor with the ground when said seismic event has been detected.

10. A non-transient computer-readable medium including program code instructions for, when said program is executed by a computer or by a processor, executing steps of a method according to claim 1.

11. A system for detecting a seismic event, which system is configured to execute a method of detecting a seismic event in accordance with claim 1.

12. The system for detecting a seismic event according to claim 1, wherein said seismic acquisition unit comprises a transmission module making it possible to transmit the processed data to an external unit.

13. A system for determining the state of coupling with the ground of at least one seismic sensor, said system being configured to execute a method of determining the state of coupling in accordance with claim 9.

14. The method according to claim 1, wherein said calculating of a time-frequency distribution $X_D(n,f)$ for at least one section $X_D(n)$ of a given duration D, of said signal, is made in the 10 Hz to 50 Hz frequency band.

15. The method according to claim 5, wherein said apodization function has a duration equal to 64 ms.

16. The method according to claim 6, wherein said apodization function has a duration equal to 1024 ms.

17. The system according to claim 12, wherein said transmission module is a radio transmission module.

18. The system according to claim 12, wherein said external unit is a mobile data recovery unit.

19. The method as claimed in claim 1, wherein said normalized time-frequency distribution obtains a magnitude that is independent of the amplitude and of the energy of the acquired signal, such that said predefined threshold value VS for detecting a seismic event, does not require adaption as a function of the characteristics of the various acquired signals.

20. The method as claimed in claim 1, wherein said method verifies whether or not said at least one seismic sensor is receiving a signal that corresponds to a seismic event, apart from any reason for non-reception.

21. The method as claimed in claim 1, wherein said method enables a seismic event, resulting from activation of a seismic source, to be detected, without knowing an instant of activation of the source (time of firing).

22. The method as claimed in claim 1, wherein said method, employed at a given time, enables detection of a seismic event and to identify an activation of the source time (time of firing) of said seismic event.

* * * * *